April 8, 1930.  F. L. SEELEY  1,753,838
NONADJUSTABLE HOLDDOWN
Filed June 3, 1929   3 Sheets-Sheet 1
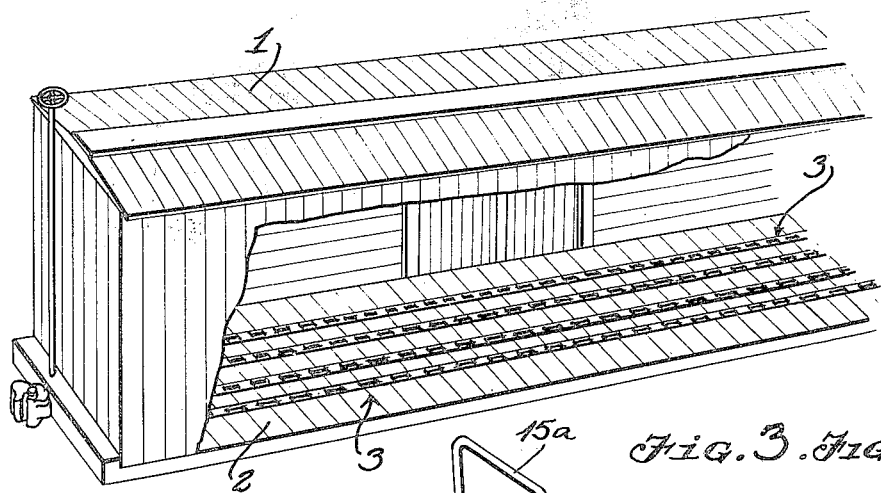
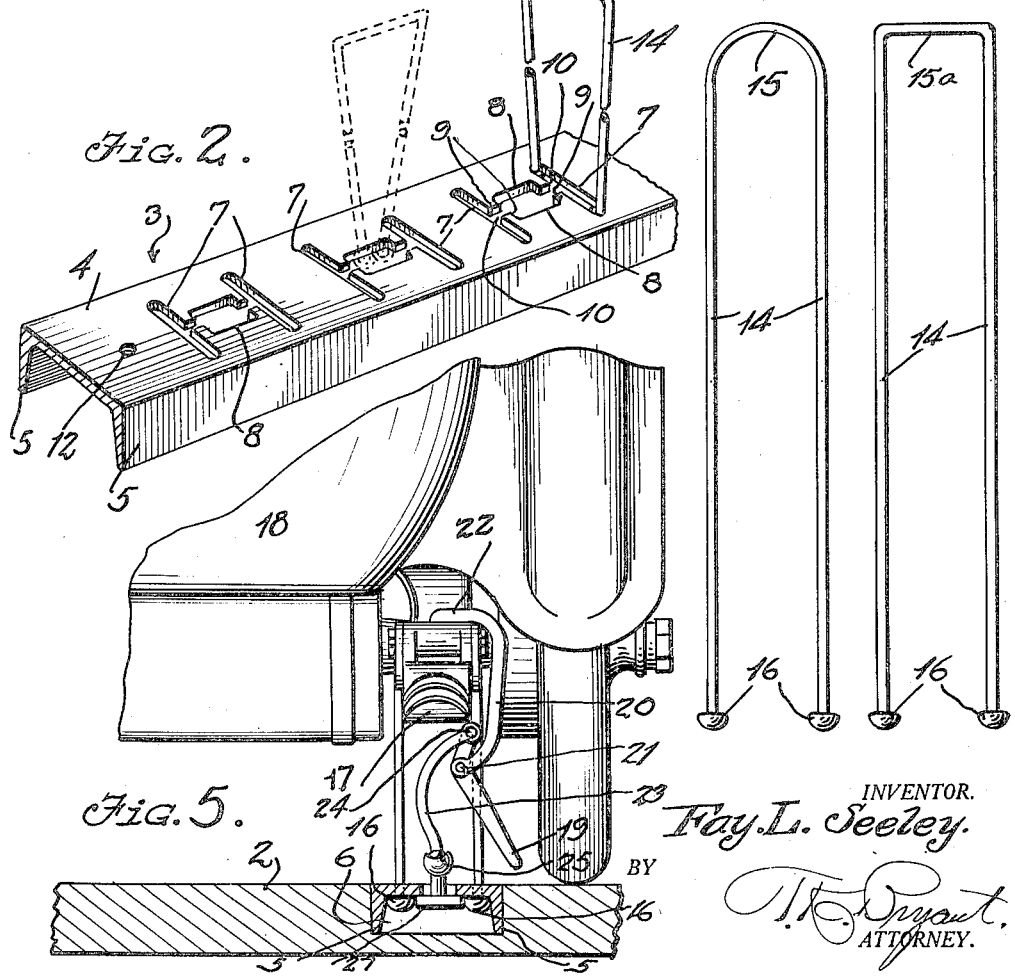
INVENTOR.
Fay L. Seeley.
BY
ATTORNEY.

April 8, 1930.                F. L. SEELEY                1,753,838
                          NONADJUSTABLE HOLDDOWN
                           Filed June 3, 1929          3 Sheets-Sheet 2
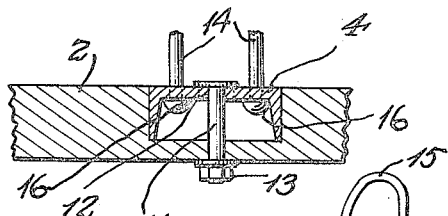
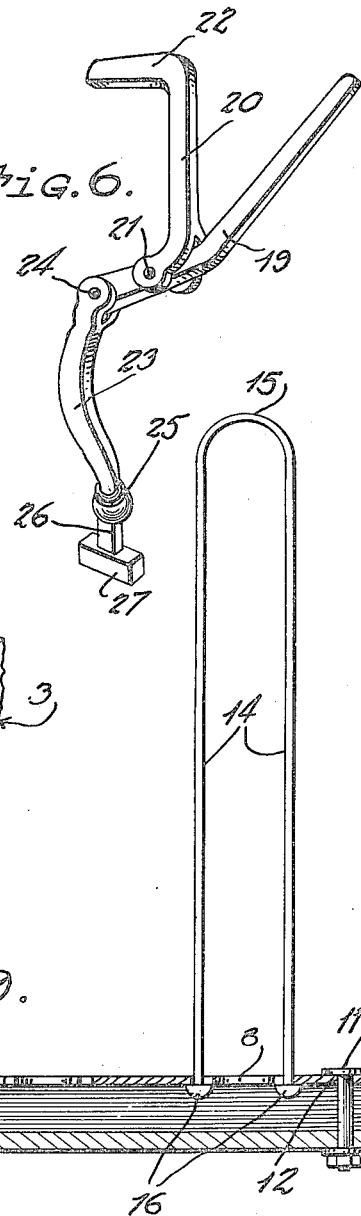
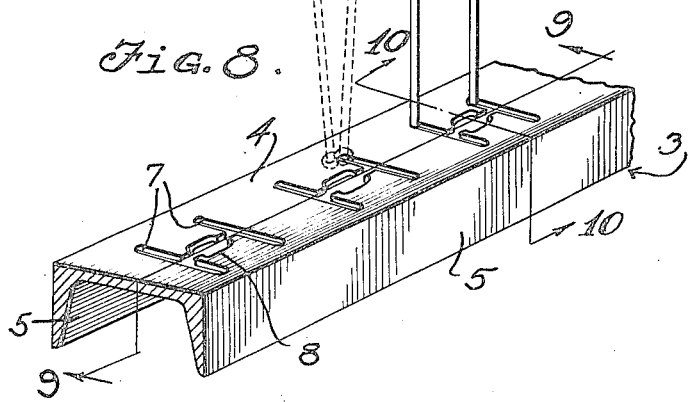
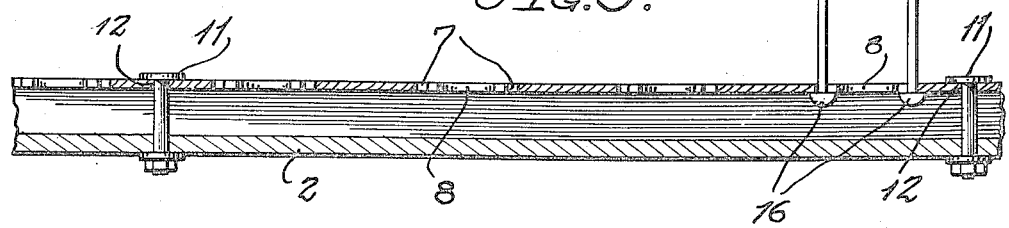
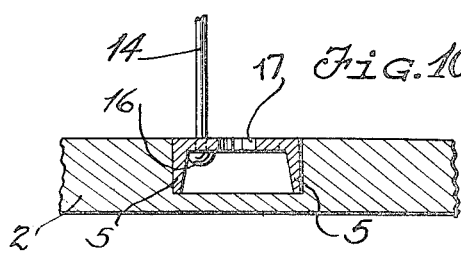
INVENTOR.
Fay L. Seeley.
BY
M. Bryant.
ATTORNEY.

April 8, 1930.    F. L. SEELEY    1,753,838
NONADJUSTABLE HOLDDOWN
Filed June 3, 1929    3 Sheets-Sheet 3
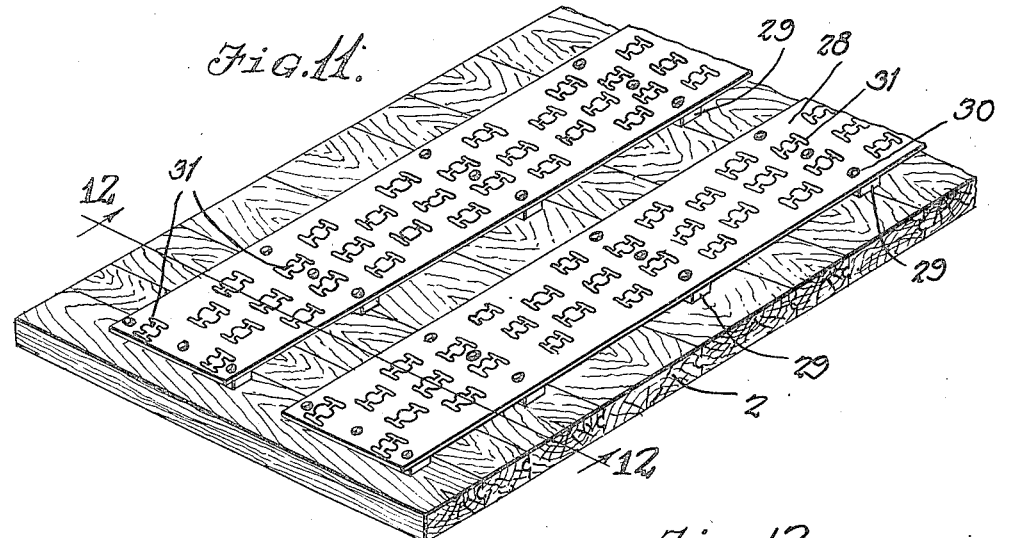
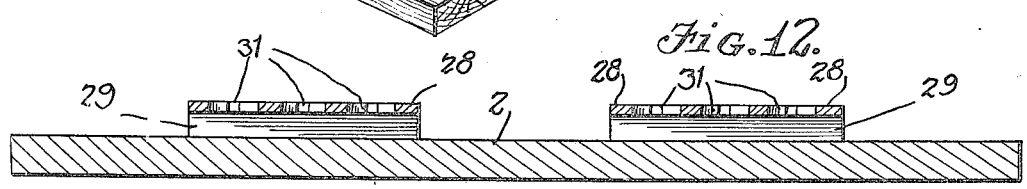
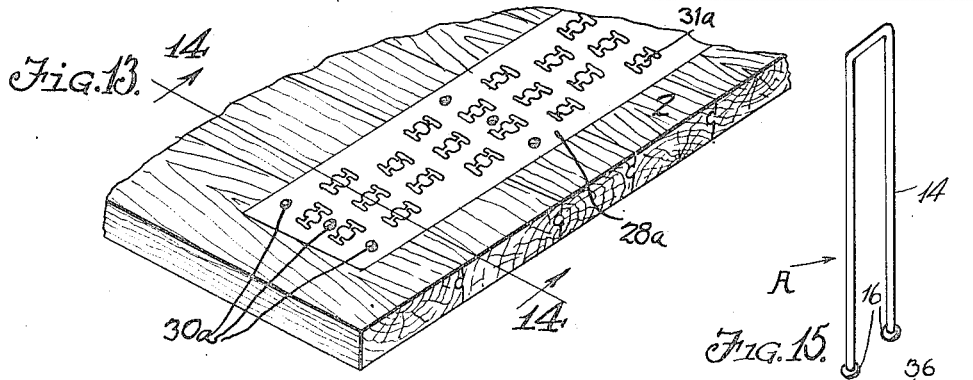
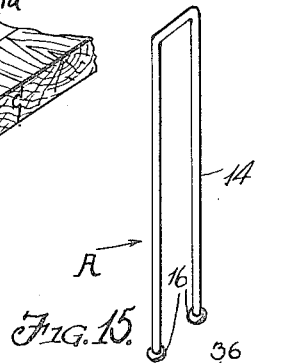
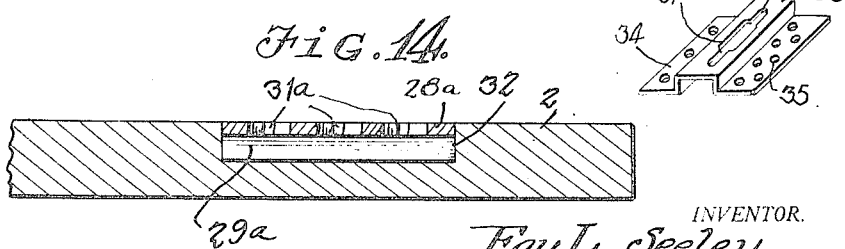
INVENTOR.
Fay L. Seeley.
BY
ATTORNEY.

Patented Apr. 8, 1930

1,753,838

UNITED STATES PATENT OFFICE

FAY L. SEELEY, OF DETROIT, MICHIGAN, ASSIGNOR TO THE EVANS AUTO LOADING CO. INC., OF DETROIT, MICHIGAN

NONADJUSTABLE HOLDDOWN

Application filed June 3, 1929. Serial No. 368,002.

This invention relates to certain new and useful improvements in automobile holddowns.

The primary object of the invention is to provide an automobile holddown as a freight car accessory in the shipment of automobiles, the holddown being constructed and operated in the absence of the usual adjustable devices, such as retaining nuts and the like, and being further non-adjustable, and while the holddown is primarily intended for association with the spring of the automobile by which the same is held under tension, it is also intended that the holddown may be associated with an axle or other part of the automobile.

More specifically, an object of the invention is to secure anchor plates to the floor of the freight car that may be either flush with the upper surface of the floor or raised thereabove and having spaced sets of openings therein of peculiar configuration to permit enlarged or headed ends of U-shaped holddowns to be received therein and shifted into retaining position, the U-shaped holddown being engaged with the spring of the automobile.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a fragmentary perspective view, partly broken away of a freight car equipped with floor anchor plates for the automobile holddown;

Figure 2 is a fragmentary perspective view of an inverted channel iron to be set into a car floor flush with the upper surface thereof and provided with H-shaped slots to receive the lower headed ends of inverted U-shaped holddown;

Figures 3 and 4 are side elevational views of two forms of inverted U-shaped holddowns of non-extensible and non-adjustable nature;

Figure 5 is a detail sectional view of the freight car floor showing the channel irons set therein, a portion of an automobile being illustrated with the compressor device for the spring engaged therewith permitting assembly of the holddown with the automobile spring and floor anchor plate;

Figure 6 is a perspective view of a spring compressor;

Figure 7 is a detail cross-sectional view showing one of the inverted channel irons set into the car floor with the lower ends of the tie down legs retained therein and the anchoring bolt for the channel irons;

Figure 8 is a fragmentary perspective view of one of the channel irons showing a holddown positioned therein with the upper looped portion extending longitudinally of the channel iron for association with an axle of an automobile, one holddown being illustrated by dotted lines partially attached to the channel iron;

Figure 9 is a longitudinal sectional view taken on line 9—9 of Figure 8;

Figure 10 is a cross-sectional view taken on line 10—10 of Figure 8;

Figure 11 is a fragmentary perspective view of a portion of a freight car floor having longitudinally extending anchor plates for the holddown spaced from the floor bottom and provided over its entire area with H-shaped slots;

Figure 12 is a cross-sectional view taken on line 12—12 of Figure 11 showing the anchor plates in Figure 11 struck upwardly of the car floor;

Figure 13 is a fragmentary perspective view of a portion of a car floor showing a longitudinally extending anchor plate of the type illustrated in Figure 11, set flush with the upper face of the floor;

Figure 14 is a detail sectional view taken on line 14—14 of Figure 13; and

Figure 15 is a perspective view of another form of the invention showing a flanged channel iron anchor foot and the holddown associated therewith.

Referring more in detail to the accompanying drawings, and particularly to Figures 1 to 10, the reference numeral 1 designates a freight car having a floor 2 in which longitudinally extending inverted channel irons generally designated by the referece numeral 100

3 are set, the channel irons 3 being arranged in parallel relation and set into longitudial grooves formed in the floor to present the upper faces of the channel irons flush with the floor.

As shown in Figure 2, the channel iron 3 that is of inverted U-shape comprises a top wall 4 and depending side walls 5, the channel iron being set into the longitudinally extending recess 6 formed in the car floor 2 with the upper wall 4 flush with the car as shown in Figure 5. Each channel iron 3 is provided over the entire length thereof with adjacently positioned H-shaped slots, the parallel slot portions 7 thereof extending transversely of the channel iron and connected by the longitudinally extending slot portions 8 of greater width than the slot portions 7, the ends of the slot 8 communicating with the slot 7, being restricted by the opposed lugs 9 projecting toward each other from the ends of the side walls of the slot 8 and adjacent portions of the slot 7 providing a restricted neck opening 10 between the slots 7 and 8. The channel irons 3 are anchored in the grooves 6 by headed bolts 11 passed through openings in the top wall 4 of the channel irons and extending through the bottom 2 of the car to receive anchor nuts 13.

The holddown associated with the channel iron anchor is of inverted U-shape as shown in Figures 3 and 4, the side legs 14 being connected at their upper ends as shown in Figure 3 by the curved loop 15 and carrying at their lower ends enlarged heads 16. The holddown shown in Figure 4 has the side legs 14 connected at their upper ends by the straight crossbar 15ª with enlarged heads 16 at their lower ends.

The automobile to be shipped is loaded in the freight car 1 and suitably positioned over the channel irons 3 to dispose the springs 17 of the automobile 18 directly above the channel irons as shown in Figure 5. The holddown shown in Figure 4 has the upper crossbar 15ª thereof engaged in enclosing relation with the spring 17 and the lower headed ends 16 inserted in the lower adjacent H-shaped slots. In order to assemble the holddown on the spring and engage the same with the channel irons, the spring 17 is compressed by the device shown in Figures 5 and 6 or by any other desired means. The spring compressor comprises a lever 19 having an upwardly directed link 20 pivoted thereto as at 21 with the upper angle extension 22 of the link 20 engaged with the upper side of the spring 17. One end of the lever 19 has a depending link 23 pivotally connected thereto as at 24 and at its lower end is universally connected as at 25 with a block 26 having a cross head 27. The cross head 27 is of a size to be passed through one of the longitudinal slot portions 8 of the H-shaped slots and upon being turned at right angles extends across such slot to be retained therein as shown in Figure 5. With the angle extension 22 upon the link 20 engaged with the spring 17 and the outer end of the lever 19 lowered, the spring 17 is depressed to permit assembly of the holddown device with the spring and channel iron. The side legs of the holddown are moved toward each other as illustrated by dotted lines in Figure 2 with the heads 16 passed through the longitudinal slot 8, the lower ends of the legs above the heads 16 then being moved through the restricted neck 10 into the crossed slot 7 and normally separated by resiliency of the legs to the full line position shown in Figure 2. The spring compressor shown in Figure 6 is then removed and upon upward movement of the spring 17, the holddown is tensioned and securely anchored at its lower ends in the channel irons as shown in Figures 2 and 5.

It is also intended to associate the holddown shown in Figure 3 with an axle bar or axle housing of an automobile and in this connection, the legs 14 extend longitudinally of the channel irons as shown in Figure 8, the enlarged heads 16 being inserted through the longitudinal slot portion 8 of the H-slots with one leg in each cross slot 7 as illustrated, the mounting of the holddown having the curved connecting upper portion 15 for engagement with the axle bar or housing being accomplished upon partial deflation of the automobile tires and subsequent inflation thereof after the holddown has been engaged with the axle.

In the form of the invention shown in Figures 11 and 12, the car floor 2 has anchor plates 28 extending longitudinally thereof in spaced relation and set upwardly therefrom by spacing strips 29 anchored to the car floor by the fastening devices 30. The anchor plates 28 are provided over their entire area with adjacently positioned H-shaped slots 31 permitting proper relative positioning of automobiles in the freight car to conserve shipping space therein and always present anchor slots in the plates 28 in proper position to receive the holddowns for the automobile springs and axles.

In the form of the invention shown in Figures 13 and 14, the anchor plate 28ª having the H-shaped slots 31ª therein is mounted on the car floor 2 flush with the upper surface thereof as shown in Figure 14 and located in a recess 32 to be spaced from the bottom wall thereof by spacer strips 29ª. Instead of providing longitudinally extending inverted channel irons as illustrated in Figures 1 to 10, a similar construction embodying an anchor foot 33 shown in Figure 15 provided with side flanges 34 may be employed, the side flanges 34 being provided with nail receiving openings 35 for anchoring the foot 33 to the floor 2. The upper wall of the channel foot 33 is provided with a longitudinally extending slot 36 enlarged intermediate its ends as at 37 for the passage of the enlarged head 16 upon the lower ends of the side legs 14 of the holddown, the heads 16 of the holddown means being moved toward each other when inserted through the slots 37 and permitted to expand to occupy positions beneath the outer ends of the slot portions 36 and be confined thereby.

It is to be understood that the holddown is capable of association with front and rear axles of the vehicle, and with other parts of the vehicle suitable for engagement by the holddown. While one type of spring depresser has been herein illustrated and described, other means may be employed for compressing the springs, such as a clamping device for direct attachment to the springs to be later removed therefrom after the vehicle has been positioned in a freight car and anchored to the floor.

From the above detailed description of the invention, it is believed that the construction and operation thereof will at once be understood, and while there are herein shown and described, the preferred embodiment of the invention, it is nevertheless to be understood that minor changes may be made therein without departing from the spirit and scope of the invention as claimed.

I claim:—

1. A holddown comprising a rigid non-extensible member engaged with the spring of a motor vehicle when compressed and at the same time interlockingly engaged with a support.

2. A holddown comprising an inverted U-shaped member adapted for engaging a part of an automobile and having side legs, an anchor member with which the lower ends of the legs are engaged, enlarged heads at the lower ends of the legs, and the anchor member having slots therein to receive the enlarged heads and restricted portions in the slots to prevent withdrawal of the holddown legs.

3. The combination with a support for motor vehicles, of an anchor member permanently set into the support flush with the upper surface thereof, and having H-shape slots therein, and a holddown of inverted U-shape with side legs enlarged at their lower ends engaged with a part of a vehicle with the enlarged ends passed through the H-shaped slots and retained therein by the enlarged heads.

4. The combination with a support for motor vehicles, of an anchor member permanently set into the support flush with the upper surface thereof, and having H-shaped slots therein, and a holddown of inverted U-shape with side legs enlarged at their lower ends and engaged with a spring of the vehicle when under compression with the enlarged lower ends passed through the H-shaped slots and retained therein by tension of the spring.

5. The combination with the floor of a freight car, of an anchor member set into the floor, and having H-shaped slots therein with the cross connecting slot of each one enlarged, and an inverted U-shaped holddown, engaged with a part of a vehicle with headed ends extended through the enlarged cross slots and retained in the narrow end slots.

6. The combination with the floor of a freight car, of an anchor member set into the floor, and having H-shaped slots therein with the cross connecting slot of each one enlarged, an inverted U-shaped holddown engaged with a vehicle spring, and said spring being depressed when mounting the holddown thereon.

7. The combination with the floor of a freight car having longitudinal recesses therein, of inverted channel irons set into the recesses flush with the upper face of the floor, and having slots therein with enlarged portions, an inverted U-shaped holddown having side legs with enlarged lower ends adapted to be engaged with a part of a vehicle with the enlarged ends passed through the enlarged portions of the slots, and retained by the walls at the ends of the slots.

8. A holddown comprising a floor anchored member having a slot therein provided with a widened entrance opening, and a holddown strap of inverted U-shape with legs having enlarged ends passed through the entrance openings and moved into the narrowed portions of the slot.

9. A holddown comprising a floor anchored member having a slot therein provided with a widened entrance opening, and a holddown strap of inverted U-shape with legs having enlarged ends passed through the entrance openings and moved into the narrowed portions of the slot, said slot being of H-shape with the widened entrance opening in the cross slot portion of the H-shaped slot.

10. A holddown comprising a floor anchored member having a slot therein provided with a widened entrance opening, and a holddown strap of inverted U-shape with legs having enlarged ends passed through the entrance openings and moved into the narrowed portions of the slot, the holddown strap being engaged with the spring of a vehicle, and said spring being depressed while the holddown is being attached thereto and to the floor anchored member.

11. A holddown comprising a floor anchored member having a slot therein provided with a widened entrance opening, and a holddown strap of inverted U-shape with legs having enlarged ends passed through the entrance openings and moved into the narrowed portions of the slot, said slot being of H-shape with the widened entrance opening in the cross slot portion of the H-shape slot, the holddown strap being engaged with the spring of a vehicle, and said spring being depressed while the holddown is being attached thereto and to the floor anchored member.

In testimony whereof I affix my signature.

FAY L. SEELEY.